Nov. 23, 1937.   L. W. BLAU   2,099,837
SEISMIC REFLECTION METHOD
Filed Dec. 30, 1933   6 Sheets-Sheet 5

Ludwig W. Blau Inventor
By W. F. Weigester Attorney

Nov. 23, 1937. L. W. BLAU 2,099,837
SEISMIC REFLECTION METHOD
Filed Dec. 30, 1933 6 Sheets—Sheet 6

Patented Nov. 23, 1937

2,099,837

UNITED STATES PATENT OFFICE 2,099,837

SEISMIC REFLECTION METHOD

Ludwig W. Blau, Houston, Tex., assignor to Standard Oil Development Company, a corporation of Delaware Application December 30, 1933, Serial No. 704,800

7 Claims. (Cl. 181—0.5)

In geophysical prospecting by the seismic reflection method, it is customary to send out seismic waves from a point on the earth called the shot-point and to record at a distant point, or at a number of distant points, the waves which arrive at the point or points by various paths. There are in general three types of waves, longitudinal, transverse, and Raleigh waves, of which the latter travel along the surface of the earth, while the others reach great depths in the earth. Thus there will be longitudinal and transverse waves which travel substantially along the surface of the earth, others slightly below the surface, and yet others at greater and greater depths. It is easy to see that the waves which reach great depths in the earth will arrive later than those which travel at lesser depths or close to the surface at the same velocity. However, the different types of waves travel with different velocities, the longitudinal being fastest and the Raleigh waves slowest. Thus waves arrive at the instrument point for several seconds after the arrival of the first, the direct longitudinal wave.

In reflection shooting, it is generally desirable to record those reflected waves which arrive at the instrument point later than one second after the explosion at the shot-point. Such waves which require one second or longer have been reflected from strata at a depth of 4000 feet or more, depending upon the geological character of the medium and upon the distance from the shot-point to the instruments. The reflected waves arrive, therefore, simultaneously with other waves which have traveled a more direct path and, some of them, at a lower velocity. It is very difficult to record reflections clearly and definitely on account of these undesirable waves.

Several methods have been proposed for canceling out, or rendering less obnoxious, these direct waves. Such a scheme has been the subject of the United States patent to H. G. Taylor, No. 1,799,398, April 7, 1931. Briefly, this inventor proposes to cancel out the direct waves by exploding two or more charges at different distances from the detector. This method is not practical for the following reason:

The charges used in reflection shooting are small; over twenty pounds of dynamite are very rarely used. A two and one-half pound stick has a diameter of approximately two inches and is about sixteen inches long. The velocity of combustion is over 15,000 feet per second; it is clear, therefore, that the explosion will require only about one ten-thousandth of one second. The shock which is thus transmitted is an impulse, and in a homogeneous elastic solid of infinite extent impulses are propagated as impulses, not as waves. Harold Jeffries has shown that heterogeneity, viscosity, or gravity cannot affect the propagation of impulses as impulses. My own investigation has revealed the cause of periodicity in seismograms; the observed waves are due:

1. To the absorption of high frequencies.
2. To the fact that group velocities, not phase velocities, are observed.

An impulse can be represented by a Fourier integral with limits of integration zero and infinity, with proper boundary conditions. Such an impulse is propagated as an impulse. If, however, the upper limit of integration is lowered from infinity to some frequency $f_0$ which is equivalent to assuming that the intervening medium absorbs all frequencies greater than $f_0$, the integrated function is no longer an impulse, but a periodic function. Only in an absorbing medium, therefore, are impulses propagated as waves, but it must be remembered that these waves contain all, hence an infinite number of, frequencies from zero to $f_0$. It is evident, then, that the method proposed in the patent mentioned above can eliminate only a few of the remaining infinite number of waves whose frequency is $f_0$ or less, and it is preposterous to speak of cancellation of the direct waves. Only the use of a filter could eliminate the direct waves and such a filter would also eradicate the reflections.

It is an observed fact that the velocities of seismic waves are different for different frequencies. This phenomenon is known as dispersion and results in the observation, not of the phase velocities, but of group velocities. These group velocities are smaller than the phase velocities, and calculations of wave lengths from observed frequencies and (group) velocities lead to grave errors.

There is, however, in addition to the above-mentioned fact that placing detectors in series or simultaneously fired shots one-half wave lengths, or an odd number of half-wave lengths apart, cannot result in cancellation, another reason why such a procedure prevents the recording of reflections clearly and with sharp beginnings. This is that such spacing causes the reflections to arrive at different times and not "at substantially the same time". To be recorded sufficiently sharp, the reflections from the two shots would have to arrive at the detector within one-thousandth second of each other. On the other hand if one shot and several detectors were used, the reflections would have to arrive at the different detectors within one-thousandth second. This would require very close spacing of shots or of detectors for, since the velocity of seismic waves in the surface layers is very low, the path-difference would have to be recorded to about three feet.

It is an object of the present invention to provide a method of reflection shooting which permits of using several simultaneously fired shots at different points or of using a plurality of detectors connected in series and assure at the same time that all reflections arrive at the detector or detectors simultaneously. In this way, the reflections are recorded sharply and the direct waves are reduced in effect by their arrival at the detectors at different times.

Other objects will be apparent from the specification and from the accompanying drawings in which latter—

Fig. 1 is a diagrammatic view showing a single detector at the surface of the ground, and a plurality of shot-points in the earth at spaced points substantially aligned with the firing point and substantially on the arc of a circle having its center vertically below the detector, and at a depth twice the depth of the reflecting layer;

Fig. 2 is a diagrammatic view showing a single shot-point at the surface of the earth and a plurality of units, each unit comprising a plurality of detectors connected in series in the earth at spaced points substantially aligned with the shot-point and substantially on the arcs of circles having their centers vertically below the firing point, and at a depth twice the depth of the reflecting layer;

Figure 2:
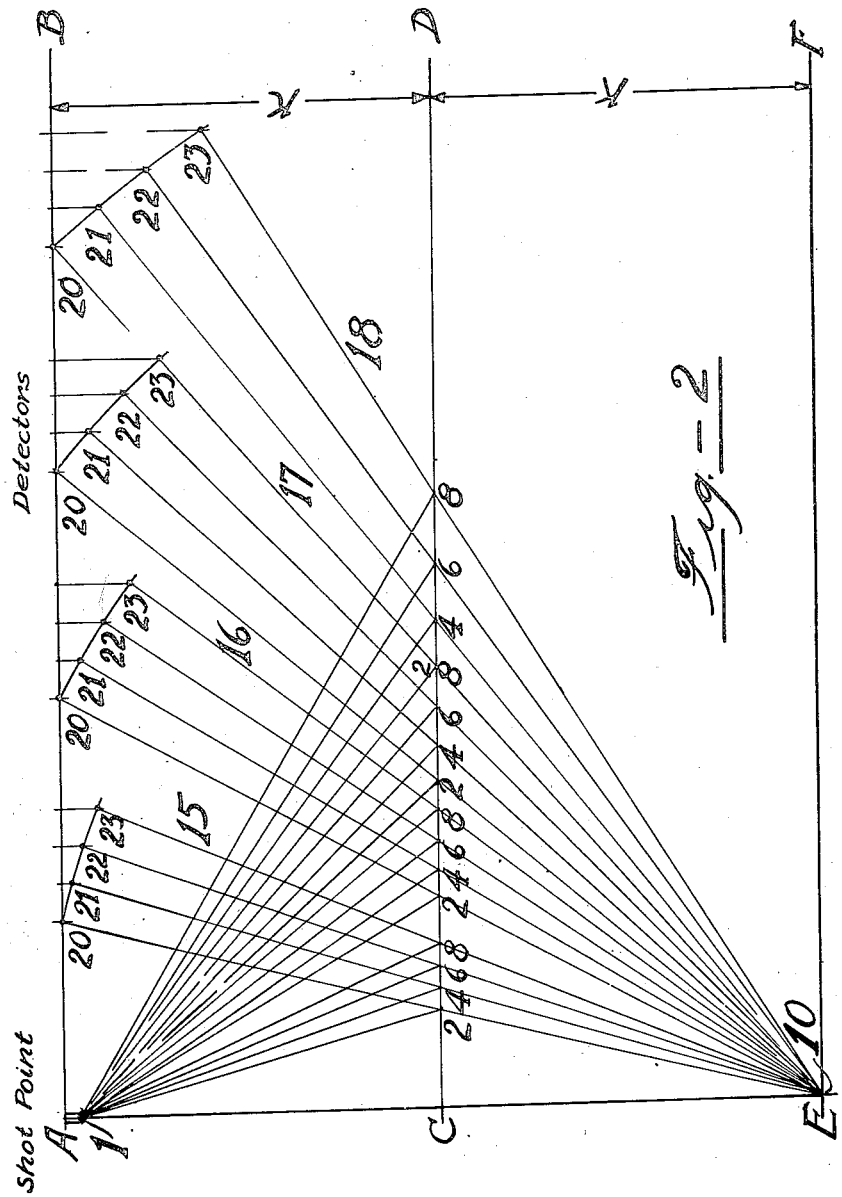
Figure 3:
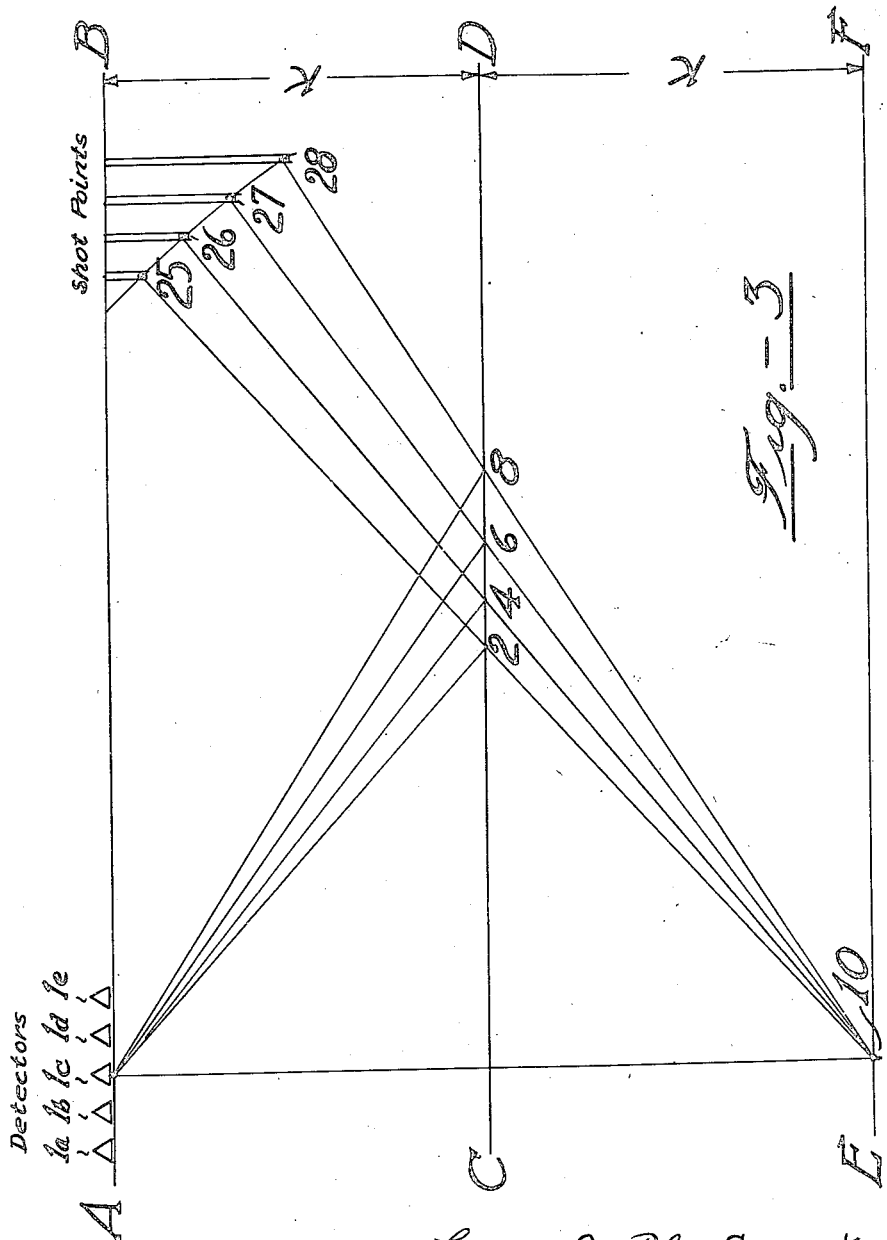
Fig. 3 is a diagrammatic view showing a plurality of detectors at the surface of the earth and a plurality of shot-points in the earth at spaced points substantially aligned with the detectors and substantially on the arc of a circle having its center vertically below the middle detectors and at a depth twice the depth of the reflecting layer.
Figure 5:
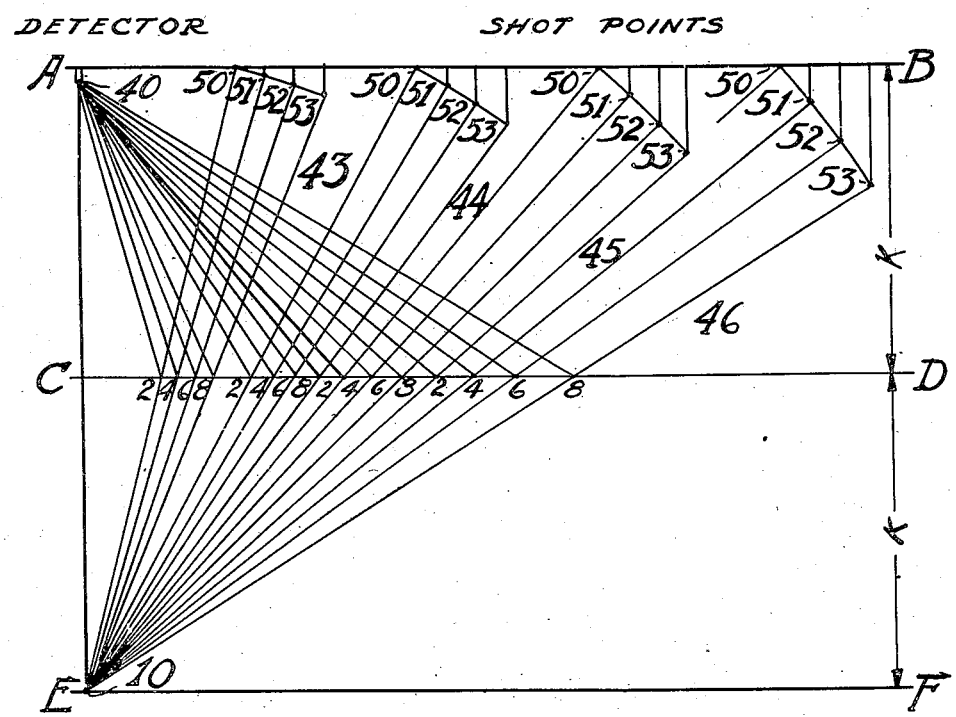
Figure 6:
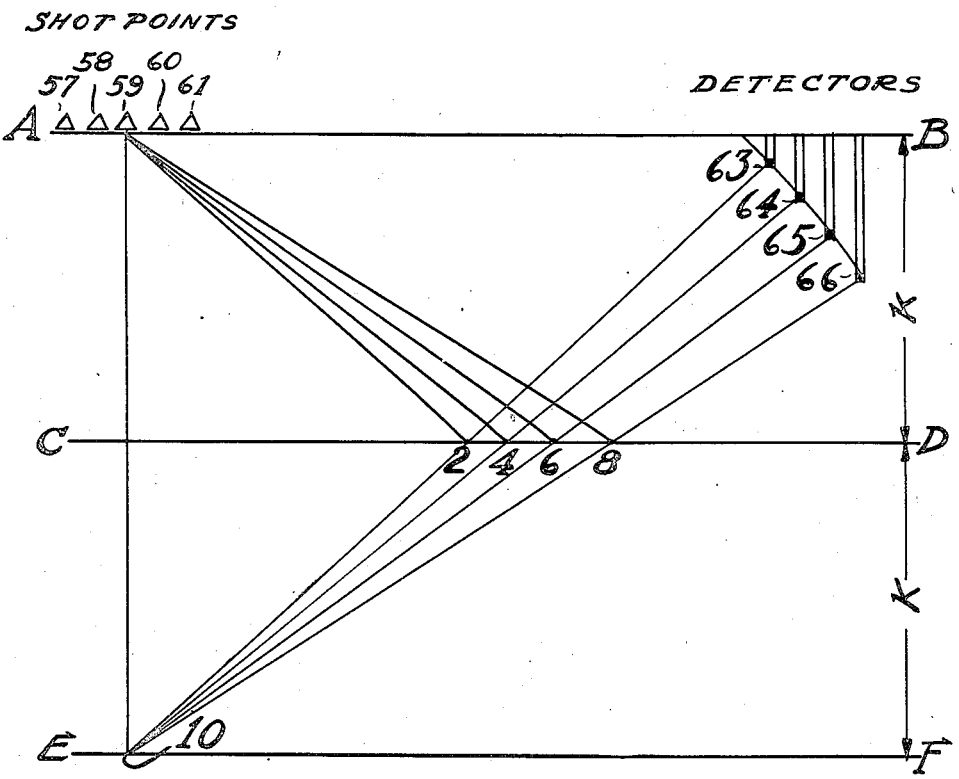

Fig. 5 is a diagrammatic view corresponding to Fig. 2 but showing a single detector at the surface of the earth and a plurality of units each unit comprising a plurality of shot-points arranged in a manner similar to the arrangements of detectors in Fig. 2, and Fig. 6 is a diagrammatic view corresponding to Fig. 3 showing a plurality of shot-points at the surface of the earth and a plurality of detectors in the earth arranged similarly to the arrangement of shot-points in Fig. 3.

Figure 1:
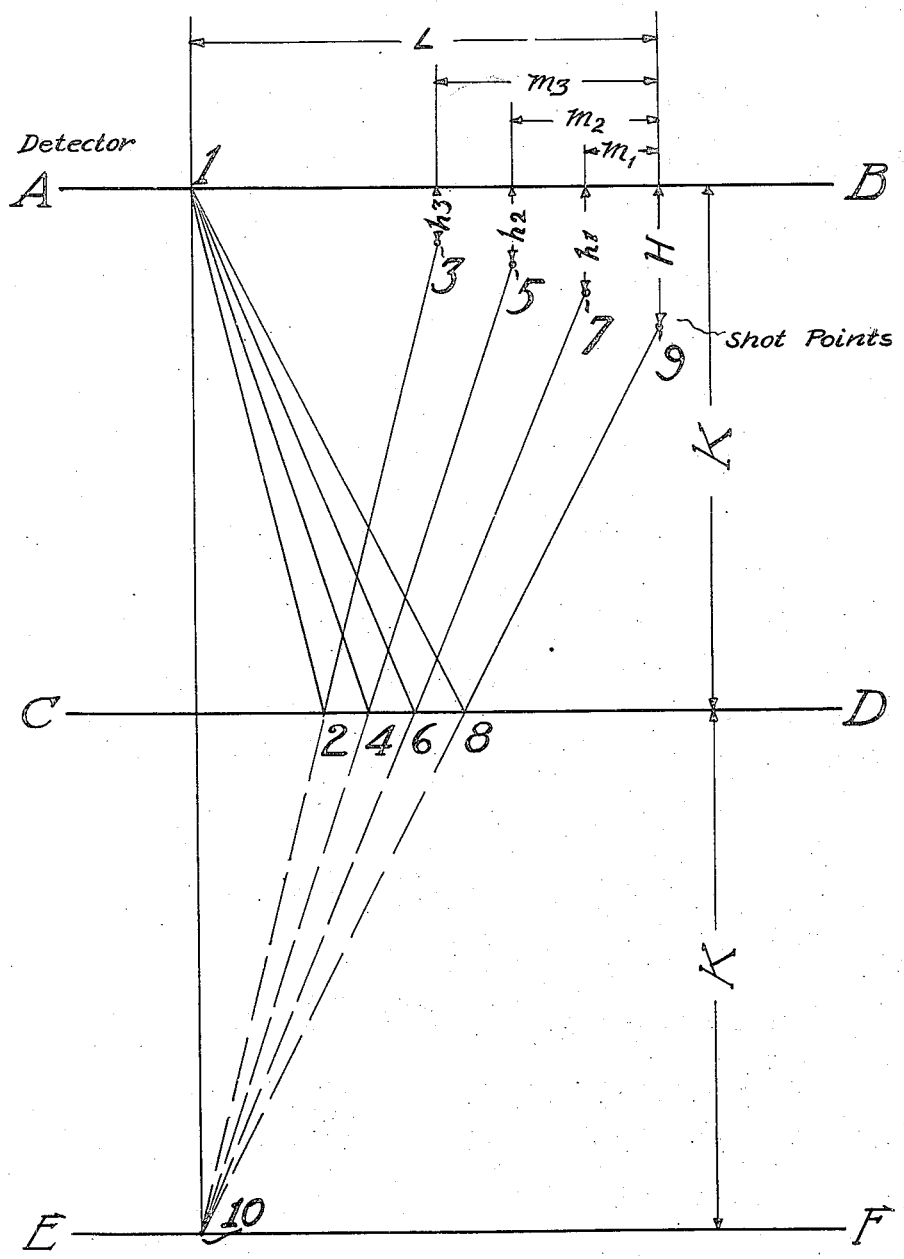

In Fig. 1, AB is the surface of the ground, CD the reflecting layer at depth K, and EF the image of the surface AB in the reflecting layer CD. Numeral 1 designates the instrument point where the detector is placed, 2 is the point of reflection and 3 a shot-point at a depth $h_3$. Numeral 5 designates a shot-point at a depth $h_2$ and 4 is the reflecting point. Likewise 7 and 9 are shot-points at depths $h_1$ and H, respectively, while 6 and 8 are points of reflection. Now, since AB, CD and EF are parallel and since $AC=CE=K$ we have, if 10 is vertically below 1, Path 1, 2, 3,=Path 10, 2, 3;
Path 1, 4, 5,=Path 10, 4, 5;
Path 1, 6, 7,=Path 10, 6, 7;
Path 1, 8, 9,=Path 10, 8, 9;

then if the points 3, 5, 7, and 9 lie on the arc of a circle with center at 10, all paths will be equal and all reflections emanating from the shot-points 3, 5, 7, and 9 will arrive at 1 simultaneously. The analytical expression for the depths of the shot-holes $h_n$ in terms H, L, $m_n$ and K is $$h_n = 2K - \sqrt{(2K-H)^2 + m_n(2L-m_n)}$$

where $n = 1, 2, 3, \ldots$

The same results can be obtained by making 1 a shot-point at, or at any desirable depth below, the surface and by placing detectors connected in series at the points 3, 5, 7, and 9. The detectors may be of any convenient electrical type.

It is seen that the direct waves arrive at the recording point or points, depending on whether multiple shots or multiple detectors are used, at radically different times, so that their effect is reduced. This reduction is especially desirable immediately before the arrival of a reflection in order that the onset of the latter may be recorded as clearly as possible. However, no cancellation of direct waves is claimed since this is a physical impossibility, but the method does assure that all reflections arrive simultaneously and this is of tremendous practical importance. Reflection times must be read to one-thousandth of one second, since the error in the calculated depth K of the reflecting layer is from 5 to 8 ft. for each thousandth second, depending on the depth and geological conditions.

Referring to Fig. 2, a modified form of the invention is shown in which 1 is made the shot-point at, or any desirable depth below, the surface of the earth. A plurality of units 15, 16, 17, and 18 are disposed at spaced points substantially aligned with the firing point 1. Each unit comprises a plurality of detectors 20, 21, 22, 23, connected in series in the earth at spaced points substantially aligned with the firing point 1, and substantially on the arc of a circle having its center 10 vertically below the firing point, and at a depth twice the depth of the reflecting layer whereby waves reflected from the layer CD arrive at the detectors 20, 21, 22 and 23 of each unit substantially simultaneously, and the direct waves arrive at the detectors at different times. The other units 16, 17 and 18 each comprise a plurality of detectors identical with those described in connection with unit 15. The detectors of the units 15, 16, 17, and 18 are disposed at spaced points substantially aligned with the firing point 1 and substantially on the arcs of circles having their centers 10 vertically below the firing point, and at a depth twice the depth of the reflecting layer whereby the waves reflected from the layer arrive at the detectors of each unit 15, 16, 17 and 18 substantially simultaneously, and the direct waves arrive at the detectors of each unit 15, 16, 17 and 18 at different times.

The same results can be obtained by making 1 the surface recording point and making the units 15, 16, 17 and 18 a plurality of groups of firing points in the earth at spaced points substantially aligned with the recording point 1. The charges of each group 15, 16, 17 and 18 are substantially aligned with the recording point 1 and substantially on the arc of a circle having its center 10 vertically below the recording point 1 and at a depth twice the depth of the reflected layer CD, whereby the waves reflected from the layer CD arrive at the recording point 1 substantially simultaneously, and the direct waves arrive at the recording point 1 at different times.

Referring to Fig. 3 another modified form of the invention is shown in which reference numerals 1a, 1b, 1c, 1d and 1e designate a plurality of surface detectors. Reference numerals 25, 26, 27 and 28 designate a plurality of charges in the earth at spaced points substantially aligned with the detectors and substantially on the arc of a circle having its center 10 vertically below the middle detector 1c and at a depth twice the depth of the reflecting layer CD, whereby the waves reflected from the layer CD arrive at the detectors 1a, 1b, 1c, 1d, and 1e substantially simultaneously, and the direct waves arrive at the detectors at different times. It will be understood that 1a, 1b, 1c, 1d, and 1e can be made the shot points and that the detectors may be placed at the points 25, 26, 27, and 28.

Figure 4:
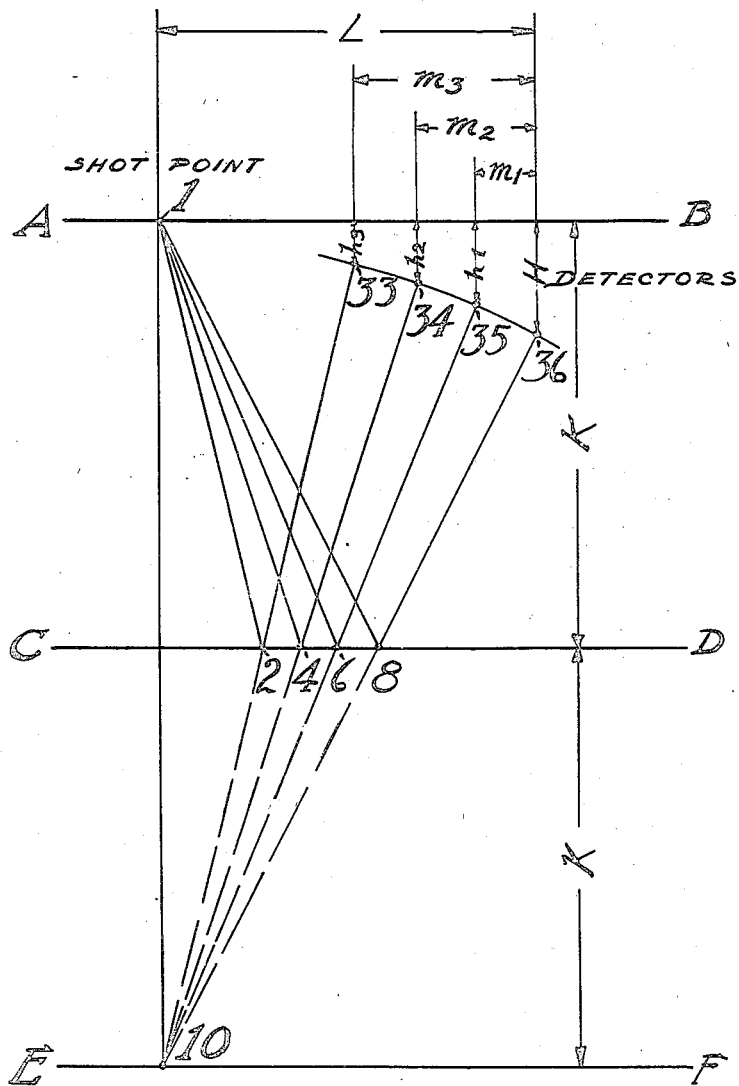
Fig. 4 is a diagrammatic view corresponding to Fig. 1 but showing a single shot-point at the surface of the ground and a plurality of detectors in the earth positioned in a manner similar to the positioning of the shot-points in Fig. 1.

Referring to Fig. 4 reference numeral 1 designates the shot-point at or any desirable depth below the surface of the earth. Reference numerals 33, 34, 35, and 36 designate a plurality of detectors in the earth at spaced points substantially aligned with the shot-point and substantially on the arc of a circle having its center 10 vertically below the shot-point 1 and at a depth twice the depth of the reflecting layer C—D, whereby the waves reflected from the layer C—D arrive at the detectors 33, 34, 35, and 36 substantially simultaneously, and the direct waves arrive at the detectors at different times.

Referring to Fig. 5, reference numeral 40 designates a detector at or any desirable distance below the surface of the earth. A plurality of units 43, 44, 45, and 46 are disposed at spaced points substantially aligned with the detector 40. Each unit comprises a plurality of shot-points 50, 51, 52, and 53, which lie substantially on the arc of a circle having its center 10 vertically below the detector 40 and at a depth twice the depth of the reflecting layer C—D, whereby waves reflected from the layer C—D arrive at the detector simultaneously, and the direct waves arrive at the detector 40 at different times. The other units 44, 45, and 46 each comprise a plurality of shot-points identical with those described in connection with unit 43.

Referring to Fig. 6, reference numerals 57, 58, 59, 60, and 61 designate a plurality of shot-points disposed along the surface of the earth. Reference numerals 63, 64, 65, and 66 designate a plurality of detectors in the earth at spaced points substantially aligned with the shot-points and substantially on the arc of a circle having its center 10 vertically below the middle shot-point 59 and at a depth twice the depth of the reflecting layer C—D, whereby the waves reflected from the layer C—D arrive at the detectors 63, 64, 65, and 66 substantially simultaneously, and the direct waves arrive at the detectors at different times.

Various changes may be made within the scope of the appended claims in which it is desired to claim all novelty inherent in the invention as broadly as the prior art permits.

I claim:

1. In geophysical prospecting, the steps which comprise creating a source of seismic waves at the surface of the earth, detecting the arrival of direct and reflected waves at spaced points along the surface of the earth substantially aligned with the source, and spacing the detectors vertically in the earth in positions determined by the horizontal distances between the detectors, by the distance from the shot-point, and by the depth and dip of the reflecting layer until they detect the arrival of the reflected waves from a given subsurface stratum simultaneously.

2. In geophysical prospecting, the steps which comprise creating a source of seismic waves at the surface of the earth, detecting the arrival of direct and reflected waves at a plurality of series of spaced points along the surface of the earth, the series being substantially aligned with the source, and spacing the detectors of each series vertically in the earth in positions determined by the horizontal distances between the detectors, by the distance from the shot-point, and by the depth and dip of the reflecting layer until the detectors of each series detect the arrival of the reflected waves from a given sub-surface stratum simultaneously.

3. In geophysical prospecting, the steps which comprise creating a source of seismic waves at the surface of the earth, detecting the arrival of direct and reflected waves at spaced points along the surface of the earth substantially aligned with the source, and spacing the detectors vertically in the earth in positions determined by the horizontal distances between the detectors, by the distance from the shot-point, and by the depth and dip of the reflecting layer until the paths of the reflected waves from the source to a given subsurface stratum and thence to the detectors are equal in length whereby these reflected waves actuate the detectors simultaneously.

4. In geophysical prospecting, the steps which comprise creating a source of seismic waves at the surface of the earth, detecting the arrival of direct and reflected waves at a plurality of groups of spaced points along the surface of the earth, the groups being substantially aligned with the source, and spacing the detectors of each group vertically in the earth in positions determined by the horizontal distances between the detectors, by the distance from the shot-point, and by the depth and dip of the reflecting layer until the paths of the reflected waves from the source to a given sub-surface stratum and thence to the detectors are equal in length for each of the detectors of any group whereby these reflected waves actuate the detectors of any group simultaneously.

5. In geophysical prospecting, the steps which comprise creating a source of seismic waves adjacent the surface of the earth, detecting the arrival of direct and reflected waves at spaced points along the surface of the earth substantially aligned with the source, and adjusting the relative positions of the detectors and the source vertically in the earth in positions determined by the horizontal distances between the detectors, by the distance from the shot-point, and by the depth and dip of the reflecting layer until the detectors detect the arrival of the reflected waves from a given subsurface stratum simultaneously.

6. In geophysical prospecting, the steps which comprise creating a source of seismic waves adjacent the surface of the earth, detecting the arrival of direct and reflected waves at a plurality of series of spaced points along the surface of the earth, the series being substantially aligned with the source, and adjusting the relative position of the source and detectors of each series vertically in the earth in positions determined by the horizontal distances between the detectors, by the distance from the shot-point, and by the depth and dip of the reflecting layer until the detectors of each series detect the arrival of the reflected waves from a given subsurface stratum simultaneously.

7. In geophysical prospecting, the steps which comprise creating a source of seismic waves at approximately the surface of the earth, detecting the arrival of direct and reflected waves at spaced points along the surface of the earth substantially aligned with the source, and adjusting the relative position of the detectors and source vertically in the earth in positions determined by the horizontal distances between detectors, by the distance from the shot-point, and by the depth and dip of the reflecting layer until the paths of the reflected waves from the source to a given subsurface stratum and thence to the detectors are equal in length whereby these reflected waves actuate the detectors simultaneously.

LUDWIG W. BLAU.